United States Patent [19]
Sullivan et al.

[11] Patent Number: 5,355,691
[45] Date of Patent: Oct. 18, 1994

[54] CONTROL METHOD AND APPARATUS FOR A CENTRIFUGAL CHILLER USING A VARIABLE SPEED IMPELLER MOTOR DRIVE

[75] Inventors: Brian T. Sullivan; Craig M. Goshaw; Paul C. Rentmeester, all of La Crosse, Wis.

[73] Assignee: American Standard Inc., New York, N.Y.

[21] Appl. No.: 107,391

[22] Filed: Aug. 16, 1993

[51] Int. Cl.$^5$ .......................... F25B 1/00; F04B 49/00
[52] U.S. Cl. ........................... 62/201; 62/228.4; 62/204; 62/182; 417/19; 417/43; 415/17
[58] Field of Search ................. 62/201, 203, 204, 209, 62/228.1, 228.3, 228.4, 228.5, 217, 185, 182; 417/15, 29, 20, 32, 43, 316; 415/1, 15, 17, 36

[56] References Cited
U.S. PATENT DOCUMENTS

| | | | |
|---|---|---|---|
| 2,955,743 | 10/1960 | Kusama et al. | 230/19 |
| 3,668,883 | 6/1972 | Ruff et al. | 62/228.4 X |
| 3,853,433 | 12/1974 | Roberts et al. | 417/423 |
| 4,081,971 | 4/1978 | Eber | 62/216 |
| 4,151,725 | 5/1979 | Kountz et al. | 62/182 |
| 4,177,649 | 12/1979 | Venema | 62/209 |
| 4,223,537 | 9/1980 | Sanborn et al. | 62/174 |
| 4,259,845 | 4/1981 | Norbeck | 62/228.1 X |
| 4,275,987 | 6/1981 | Kountz et al. | 415/17 |
| 4,282,718 | 8/1981 | Kountz et al. | 62/115 |
| 4,282,719 | 8/1981 | Kountz et al. | 62/115 |
| 4,355,948 | 10/1982 | Kountz et al. | 415/1 |
| 4,432,212 | 2/1984 | Tachibana et al. | 62/229 |
| 4,464,720 | 8/1984 | Agarwal | 364/431 |
| 4,514,991 | 5/1985 | Zinsmeyer | 62/209 |
| 4,546,618 | 10/1985 | Kountz et al. | 62/201 |
| 4,562,531 | 12/1985 | Enterline et al. | 364/164 |
| 4,581,900 | 4/1986 | Lowe et al. | 62/228 |
| 4,586,870 | 5/1986 | Hohlweg et al. | 415/1 |
| 4,589,060 | 5/1986 | Zinsmeyer | 364/148 |
| 4,608,833 | 9/1986 | Kountz | 62/228 |
| 4,627,788 | 12/1986 | Keyes, IV et al. | 415/11 |
| 4,640,665 | 2/1987 | Staroselsky et al. | 415/1 |
| 4,646,534 | 3/1987 | Russell | 62/228 |
| 4,656,589 | 4/1987 | Albers et al. | 364/431 |
| 4,686,834 | 8/1987 | Haley et al. | 62/209 |
| 4,949,276 | 8/1990 | Staroselsky et al. | 364/509 |
| 4,971,516 | 11/1990 | Lawless et al. | 415/1 |
| 5,056,032 | 10/1991 | Swanson et al. | 364/483 |
| 5,058,031 | 10/1991 | Swanson et al. | 364/483 |
| 5,195,875 | 3/1993 | Gaston | 417/282 |

Primary Examiner—Harry B. Tanner
Attorney, Agent, or Firm—William J. Beres; William O'Driscoll; Peter D. Ferguson

[57] ABSTRACT

A controller for controlling the capacity of a centrifugal chiller compressor. The compressor is driven by an electric motor and has variable inlet guide vanes that control the flow of refrigerant to the compressor. The controller establishes a dimensionless plot of possible points of compressor operation relating the pressure coefficient and the capacity coefficient of the compressor. The current operating point of the centrifugal compressor is located on the plot and a dynamic surge boundary control curve is positioned proximate a region of actual surge. Control is exercised responsive to the variations of the region of actual surge and the surge boundary control curve for controlling compressor capacity by varying the opening of the inlet guide vanes and varying the speed of the compressor to move the operating point of the compressor proximate the surge boundary control curve.

36 Claims, 5 Drawing Sheets

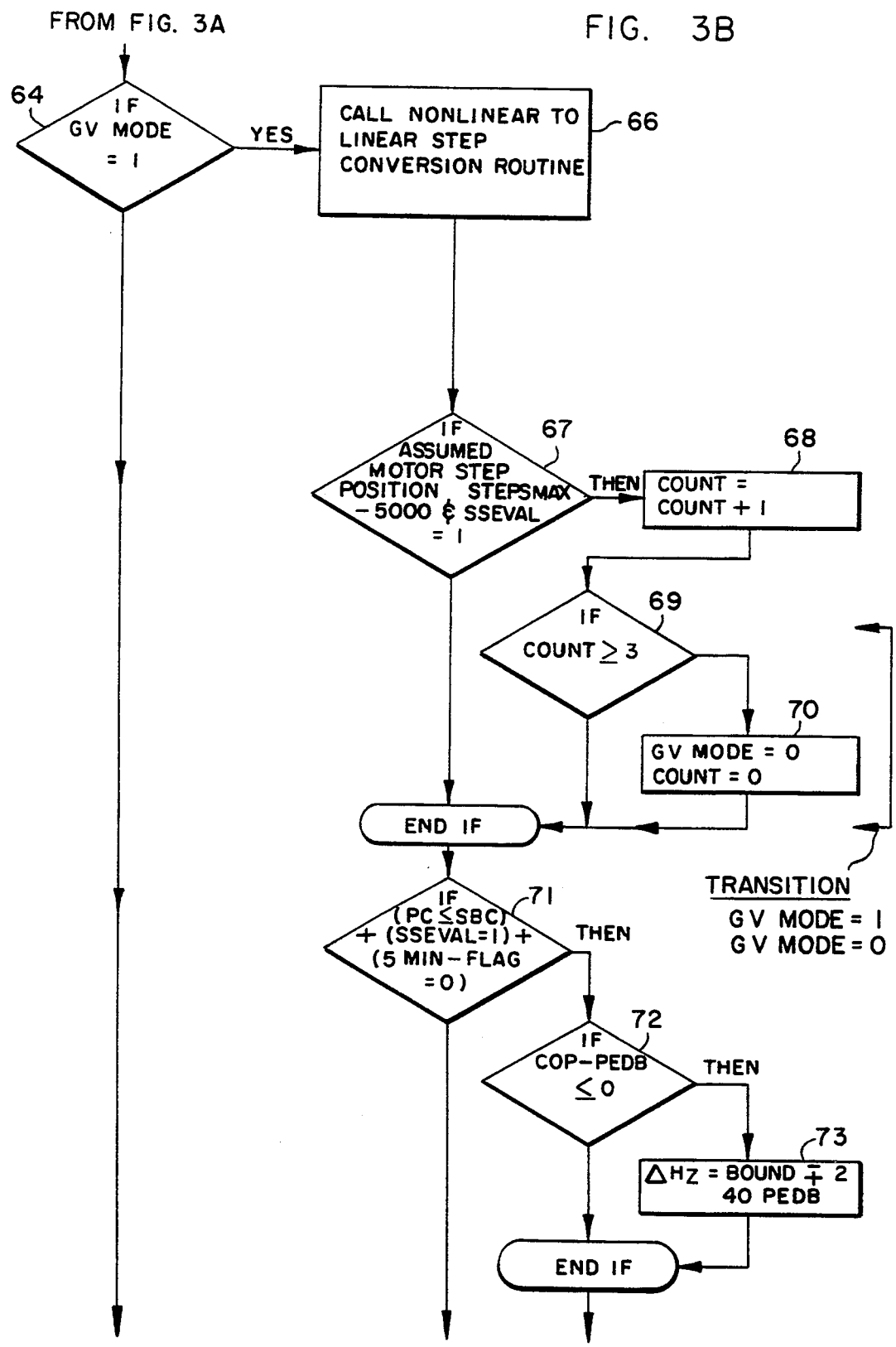

CONTROL METHOD AND APPARATUS FOR A CENTRIFUGAL CHILLER USING A VARIABLE SPEED IMPELLER MOTOR DRIVE

TECHNICAL FIELD

This invention relates generally to centrifugal chiller refrigeration systems. More particularly, it relates to a capacity control system for the variable speed impeller motor drive of a centrifugal chiller especially adapted for operating the chiller as efficiently as possible, but without risking operation of the chiller under surge conditions.

BACKGROUND OF THE INVENTION

Air conditioning systems typically incorporate the standard components of a refrigeration loop to provide chilled water for cooling a designated building space. A typical refrigeration loop includes a compressor to compress refrigerant gas, a condenser to condense the compressed refrigerant to a liquid, and an evaporator that utilizes the liquid refrigerant to cool water. The chilled water is then piped to the space to be cooled.

Air conditioning systems that utilize so called centrifugal compressors are referred to as centrifugal chillers. Centrifugal chillers typically range in size from 100 to 10,000 tons of refrigeration, and are recognized as providing certain advantages and efficiencies when used in large installations such as commercial buildings. The reliability of centrifugal chillers is high, and the maintenance requirements are low, because centrifugal compression involves the purely rotational motion of only a few mechanical parts.

A centrifugal compressor has an impeller that can be thought of as a fan with many fan blades. The impeller typically is surrounded by a duct. The refrigerant flow to the impeller is controlled by variable inlet vanes located in the duct at the inlet to the impeller. The inlet guide vanes operate at an angle to the direction of flow and cause the refrigerant flow to swirl just before entering the compressor impeller. The angle of the inlet guide vanes is variable with respect to the direction of refrigerant flow. As the angle of the inlet guide vanes is varied and the inlet guide vanes open and close, the refrigerant flow to the compressor is increased or decreased. In many applications, the inlet guide vanes are variable ninety degrees between a fully closed position perpendicular to the direction of the refrigerant flow to a fully open position in which the inlet guide vanes are aligned with the refrigerant flow. When the cooling load is high, the guide vanes are opened to increase the amount of refrigerant drawn through the evaporator, thereby increasing the operational cooling capacity of the chiller.

It is important to be able to vary the output capacity of an air conditioning system to meet all conditions of demand in the air conditioned space. At times of high cooling demand, the compressor will run at maximum load or full capacity. At other times the need for air conditioning is reduced and the compressor will run at a reduced capacity. The output of the air conditioning system then is substantially less than the output at full capacity. There is also a need to operate the compressor at the most efficient mode for the capacity that is required at any given time. This is required to reduce the electrical consumption of the air conditioning system to the lowest possible amount for the given load. The most efficient point of operation for a centrifugal compressor is very near a condition known as surge. Operation in the surge condition, however, is undesirable since it is very inefficient and can actually cause damage to the compressor.

In most centrifugal chillers, the compressor is driven by an electric induction motor, either directly or through speed-increasing gears. Because the optimum performance of a centrifugal compressor is strongly influenced by the rotating speed of the centrifugal compressor, much attention has been paid to systems to control the speed of the compressor. Induction motor speed is a function of the frequency of the power supplied to it. An inverter can vary the frequency of the power and thereby control motor speed.

The volume of refrigerant flow through a centrifugal compressor must be adjusted for changes in the load demanded by the air conditioning requirements of the space that is being cooled. Accordingly, a modulating capacity control system is a part of every centrifugal chiller. Control is typically accomplished by varying the inlet guide vanes and the impeller speed, either separately or in a coordinated manner.

The most common method of varying compressor speed is to vary the frequency of the alternating current that is supplied to the induction motor that drives the compressor. As previously indicated, variable-frequency inverters are used to modulate the motor speed.

Control of a centrifugal chiller is typically accomplished by monitoring the temperature of the chilled water as the water leaves the evaporator. The temperature of the water at that point is referred to as the Leaving Water Temperature. The Leaving Water Temperature is an industry wide accepted criteria for establishing control of a centrifugal chiller. The set point of the Leaving Water Temperature, which is the desired operating temperature of the chilled water as the water leaves the evaporator, is selected by the user. U.S. Pat. No. 4,686,834 to Haley et al. is directed to a centrifugal compressor controller for minimizing power consumption while avoiding surge. This patent is assigned to the assignee of the present invention and is incorporated by reference herein.

As discussed above, centrifugal chillers are most efficient when operated near a condition known as surge. At surge, a point is reached where, for the desired cooling output, the pressure differential between the refrigerant immediately at the outlet of the impeller and the pressure of the refrigerant at the inlet of the impeller is large. In this condition, the refrigerant will surge, flowing first backward and then forward through the compressor. This is an unstable operating condition that must be avoided. It is desired to operate the impeller at a speed that is just great enough to avoid the compressor going into the surge condition. This is the lowest speed possible to maintain the compressor in a functional operating condition and meet the cooling requirements. Operating at any faster speed is not efficient from an energy consumption standpoint.

The operating configuration of the compressor which is most efficient for any given capacity is with the inlet guide vanes set to some maximum open position and the rotational speed of the impeller at the lowest possible speed that does not induce surge conditions. In the maximum open position, the variable inlet vanes may still be set at a slight angle with respect to the refrigerant flow direction so that swirl is still imparted to the refrigerant prior to entering the compressor or, alternatively, the vanes may be aligned with the direction of refrigerant flow. The rotational speed of the compressor impeller is controlled by utilizing an inverter that is capable of varying the frequency of the power being supplied to the motor that drives the impeller. Rotational speed of the motor is a direct function of the frequency of the power.

In the past a number of ideas have been advanced in an effort to control centrifugal compressors to achieve high efficiency and yet to avoid surge conditions. U.S. Pat. No. 4,608,833 to Kountz includes a learning mode which alternately incrementally lowers compressor speed and adjusts the position of the prerotational vanes. Once a surge is detected, a current surge surface array is updated and an operating mode is initiated. The initial surge surface array of Table II is generated using minimum Mach number together with a speed correction. However, storage of surge surface arrays for all relevant compressor operating conditions is memory intensive. Additionally, the measurement of the physical position of the inlet guide naves is undesirable in view of the mechanical linkages and economics involved.

U.S. Pat. No. 4,456,618 provides for continual measurement of prerotational vane position, compressor head, and suction flow to calculate an operating point for regulating both the inlet guide vanes and compressor speed. A microprocessor compares the operating point to a prestored surge surface generated by equations comparing compressor head to suction flow rate. If the calculated operating point is too far from the prestored surge surface, the system tries to move the operating point closer to the prestored condition. This system does not determine a region of actual surge based on actual surge events that occur to the specific compressor. It is undesirable to measure the position of the inlet guide vanes and to measure suction flow.

Another existing idea for compressor control is disclosed in U.S. Pat. No. 4,151,725. This method utilizes an inferred compressor head valve to define a control path. Surge avoidance is attempted by deriving a critical Mach number that is a function of compressor head and vane position. The compressor motor is then prevented from delivering an output that is below that critical Mach number. This system generates a surge curve from test data and develops equations to define an operating area that avoids the test surge area. This approach is limited in that it does not account for the actual surge events that occur to the specific compressor over time while functioning in the compressor's unique operating environment.

These methods and others have not proved satisfactory when implemented in the field. The surge point has a certain dynamic that is not accounted for in the previous control methods. Even identically designed compressors have varying surge points under identical operating conditions. Also, over time, the surge points in a given compressor change. Calculated fixed surge points and surge surfaces have not proved the answer to the most efficient operation. For such systems to routinely avoid surge, the operating point must be set artificially distant from the calculated surge conditions since the actual surge conditions unique to the specific compressor are not known. By so setting the operating point, a certain efficiency is sacrificed in the interest of avoiding surge.

The present invention sets forth a control approach developed to improve the efficiency of a centrifugal chiller using a variable speed impeller motor drive. The control methodology was developed with two objectives in mind. The primary control objective is to modulate the compressor capacity to meet the desired chilled water set point. The second objective is to optimize unit efficiency by operating the compressor impeller at the lowest possible speed, while still achieving the desired load capacity and avoiding surge.

Accordingly, it is a general object of the present invention to provide an improved capacity control system of a centrifugal chiller wherein the compressor speed and guide vane position are adjusted to the most efficient operating point while at the same time avoiding a surge condition.

It is an object of the present invention to provide a variable speed capacity control system for a centrifugal chiller wherein the compressor speed and the inlet guide vane position are modulated to meet the chilled water setpoint of an evaporator.

It is an object of the present invention to provide an improved capacity control system of a centrifugal chiller wherein modulating compressor speed and guide vane position is provided in order to place the compressor operating point on an adaptive or dynamic surge control boundary curve.

It is a further object of the present invention to provide an improved capacity control system of a centrifugal chiller wherein the operating point of the compressor is placed on a non-dimensional map generated from sensed centrifugal chiller values.

It is still a further object of the present invention to provide an improved capacity control system of a centrifugal chiller wherein the position of the surge control boundary curve is updated by the detection of real surge conditions that occur over time and is adjusted in response thereto.

It is still a further object of the present invention to provide an improved capacity control system of a centrifugal chiller which does not measure or record an actual surge curve.

It is an additional object of the present invention to provide an improved capacity control system of a centrifugal chiller which operates to prevent or avoid surge using measurements made in the condenser and evaporator.

It is a further object of the present invention to provide an improved capacity control system of a centrifugal chiller which does not require measurements of inlet guide vane position or suction flow rate.

SUMMARY OF THE INVENTION

The present invention utilizes readily available parameters sensed in the centrifugal chiller to accurately approximate and generate a dimensionless map that defines the compressor operation. Additionally, actual surge events are detected and used to continually update and define a surge control boundary curve of the compressor. The system defines this surge control boundary curve and movably positions it in relation to detected actual surge events. The system then operates the compressor close to the surge control boundary curve. Location of the surge control boundary curve on the map is updated continuously based upon the detected surges to ensure that the compressor is operating as close as possible to an actual surge condition.

As distinct from previous control systems, the present invention looks at real surge events that occur to the compressor in question as it operates in its unique operating environment and uses those real surge events to move a surge control boundary curve. The surge control boundary curve is a predefined function that is continuously adjusted upon the occurrence of each surge event. An operating curve is defined by the surge control boundary curve and the compressor is operated in that region. The operating curve is positioned to provide the most efficient operation while having a selected probability of avoiding a future surge condition. The actual surge events are continuously monitored to optimize the surge boundary control curve and to reflect changes that occur in the actual surge events over time so that the compressor operation can be brought to its most efficient point of operation close to the real area of surge occurrence. This is a decided advantage for efficient compressor control as compared to the existing schemes.

The invention includes a method for controlling the capacity of a centrifugal compressor. The compressor is driven by an electric motor and has variable inlet guide vanes that control the flow of refrigerant to the compressor. The compressor functions to compress refrigerant for cooling a chilled water supply to a desired temperature. The chilled water is utilized for conditioning the temperature of a space. The controller establishes a dimensionless plot of possible points of compressor operation relating the pressure coefficient and the capacity coefficient of the compressor. The current operating point of the centrifugal compressor is located on the plot based upon continuously monitored or sensed chiller values. A dynamic surge boundary control curve is defined based upon the actual surge occurences, and control is exercised responsive to the dynamics of the variations of the surge occurences and the surge boundary control curve for controlling compressor capacity by varying the opening of the inlet guide vanes and varying the speed of the compressor to move the operating point of the compressor proximate the surge boundary control curve while both avoiding surge and maintaining the evaporator chilled water setpoint.

BRIEF DESCRIPTION OF THE DRAWINGS

FIGS. 3A, 3B and 3C taken together are a flow chart depicting the control method of the present invention.

DETAILED DESCRIPTION OF THE DRAWINGS

Figure 1:
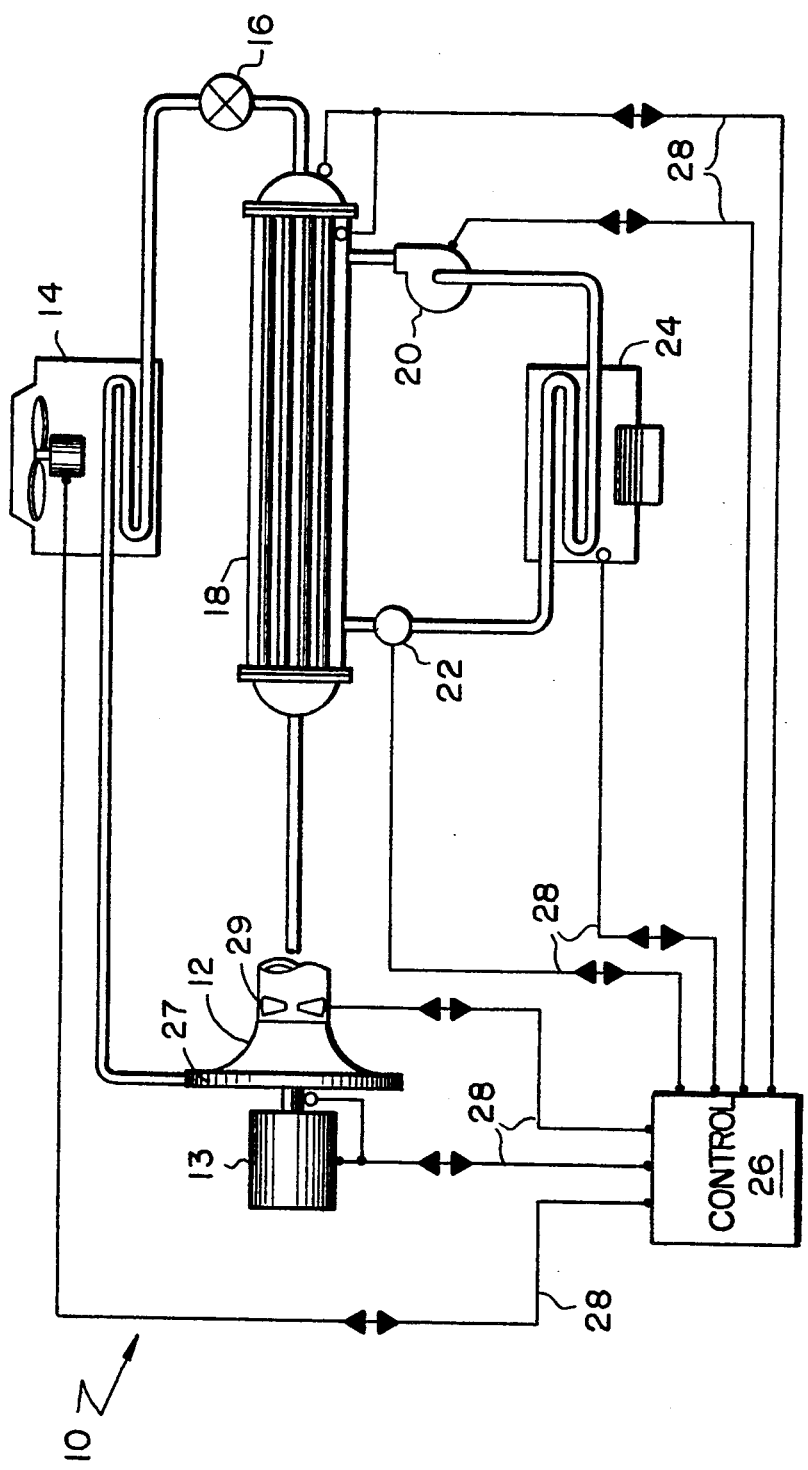
FIG. 1 is a schematic view of an air conditioning system having a control system in accordance with the present invention.

An air conditioning system that incorporates the standard components of a refrigeration loop is shown generally at 10 in FIG. 1. Representative systems are shown in U.S. Pat. No. 4,223,537 to Sanborn et al., U.S. Pat. No. 4,081,971 to Eber, and U.S. Pat. No. 3,853,433 to Roberts et al. These patents are assigned to the assignee of the present invention and are incorporated herein by reference.

The air conditioning system 10 includes a compressor 12 to compress refrigerant vapor. The compressor 12 is typically an electric motor driven unit powered by an induction motor 13. An important characteristic of induction motors is that motor speed can be controlled by varying the frequency of the electric power that is supplied to the motor 13. The compressor 12 compresses and moves pressurized refrigerant vapor to a condenser 14. The condenser 14 is a heat exchanger that extracts heat from the refrigerant vapor and, at the same time, condenses the refrigerant gas to a liquid. The heat extracted from the refrigerant is either directly exhausted to the atmosphere by means of an air cooled condenser, or indirectly exhausted to atmosphere by heat exchange with another water loop and a cooling tower. The pressurized liquid refrigerant passes from the condenser 14 through an expansion device such as an orifice 16 to reduce the pressure of the refrigerant liquid. The refrigerant then flows into the evaporator 18, where the refrigerant performs the cooling function. In the evaporator 18, the refrigerant changes state a second time and evaporates into a vapor. This change of state and any superheating of the refrigerant vapor causes a cooling effect that cools water passing through the evaporator 18. The chilled water is pumped by a pump 20 through a flow switch 22 to an air handling unit 24. Warm air from the space that is being air conditioned is drawn across coils in the air handling unit 24 that contain the chilled water, thereby cooling the air. The cool air is then forced through the air conditioned space, cooling the space.

A controller 26 is in two way communication with various components of the air conditioning system 10 as indicated by communication channels 28 in FIG. 1. These two way communication channels 28 provide sensor data to the controller 26 and permits the controller 26 to send commands to the various components responsive both to external user inputs and to internal sensor data received from sensors located at the various components of air conditioning system 10.

The compressor 12 includes an impeller 27 and inlet guide vanes 29. A centrifugal chiller such as is depicted in FIG. 1 approaches its most efficient operation when the compressor 12 is operating with the variable inlet guide vanes 29 open to a predetermined maximum position, and with the compressor impellers 27 rotating as slow as possible. To achieve this type of operation, a centrifugal chiller is required to perform as close as possible to the undesirable operating condition known as surge. Thus, the control approach comprising this invention is important for several reasons. First, it addresses the difficult task of properly coordinating control of the chiller's inlet guide vanes 29 and impeller rotational speed to match unit load capacity. Second, the control method handles the occurrence and subsequent avoidance of surge in an unique way.

As the rotational speed of a centrifugal compressor impeller 27 decreases, the ability of the compressor 12 to produce a pressure rise from the evaporator 18 to the condenser heat exchanger 14 decreases. The condition known as surge results when this differential pressure is too large for a given rotational speed. The intensity of a surge will vary based on operating conditions and is undesirable for several reasons. One reason surge is undesirable is because of the audible noise it produces in the air conditioning unit. A second reason surge is undesirable is because it produces rapid operating changes in the unit. These rapid changes cause a loss of control performance and the potential for unit shut down due to exceeding limit controls. Limit controls are set system parameters which, when exceeded, causes the air conditioning system to shut down. One approach to avoiding surge is described in U.S. Pat. No. 4,686,834 to Haley et al. This patent is assigned to the assignee of the present invention and is incorporated herein by reference.

Figure 2:
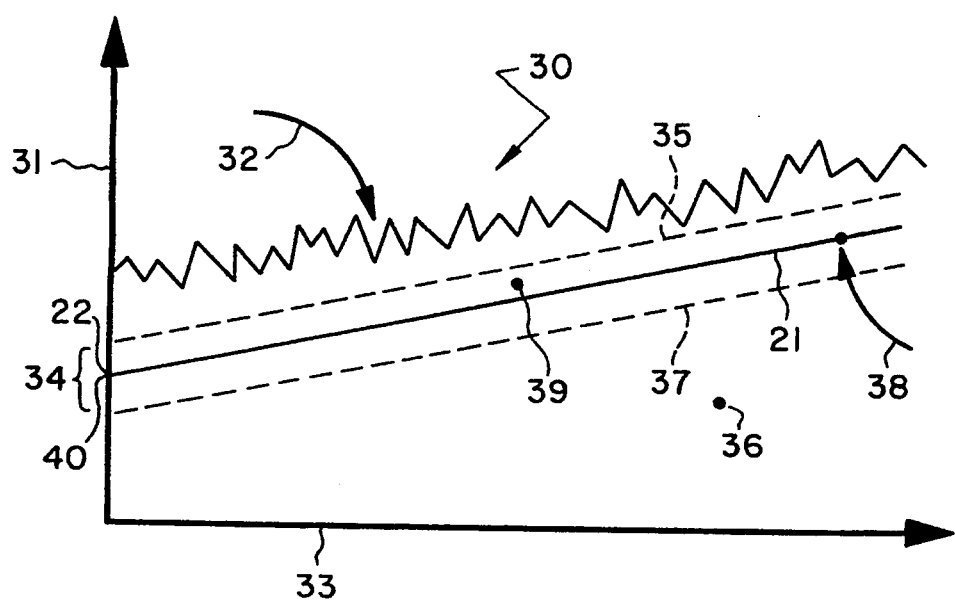
FIG. 2 is a dimensionless plot of the air conditioning system compressor operation as indicated by the relation of the capacity coefficient to the pressure coefficient.

The equations developed in accordance with the present invention for impeller speed control and surge avoidance are based on continuously locating a compressor operating point 36 on a non-dimensional compressor map 30, as depicted in FIG. 2. The non-dimensional compressor map 30 is represented by a plot of a compressor pressure coefficient value 31 versus a compressor capacity coefficient value 33 calculated from sensor data taken every Leaving Water Temperature sample period. Preferably, this sample period is as short as possible. Typically, a chiller system may operate with a five second sample period. However, this can be modified as desired. The compressor capacity coefficient value 33 is a measurement of the cooling capacity of the air conditioning system 10. The compressor pressure coefficient value 31 is a measurement of energy added to the refrigerant by the compressor 12 as the compressor 12 compresses the refrigerant gas.

These non-dimensional coefficients take into account the relationship of impeller rotational speed on pressure rise and capacity as shown below. The compressor capacity coefficient (cap) is considered the independent variable and is calculated in accordance with the present invention in the following manner:

$$Cap = \frac{K\,Q}{N\,Dia^3} \quad (1)$$

The chiller pressure coefficient (PC) is determined in accordance with the present invention as follows:

$$PC = \frac{(1.3159e9)(\text{Delta } H \text{ isentropic})}{(Numstages)(Dia^2)(N^2)} \quad (2)$$

Where:
Q = compressor vapor flow in cubic feet per minute as approximated by the refrigeration tonnage produced by the chiller, as measured by the gallons per minute of water through the evaporator and the change in temperature of the water across the evaporator. This tonnage is converted to a refrigerant gas flow rate by dividing by the latent heat of the refrigerant and multiplying by refrigerant gas specific volume. The gallons per minute of water through the evaporator is determined by a relationship between pressure drop of the water across the evaporator tube bundle versus chilled water flow.
N = Rotational speed of the impellers in RPM as calculated from commanded inverter frequency (i.e. 60 Hz), neglecting motor slip. Neglecting motor slip is a reasonable approximation for low slip motors.
Dia = Impeller diameter.
Numstages = Number of compression stages in the chiller.
Delta H isentropic = isentropic enthalpy rise, using the evaporator pressure and temperature and condenser pressure to calculate the enthalpy rise across the compressor.
K = A constant that corrects for the units used in the equation.

Since the number of stages (numstages), the value (1.359E9), and the impeller diameter (Dia) are a constant (c) for any particular compressor, the calculation of the chiller pressure coefficient (PC) reduces to:

$$PC = \frac{(c)\,\text{Delta } H \text{ isentropic}}{N^2}$$

In the non-dimensional compressor map 30, the compressor pressure coefficient is represented as the ordinate 31 and the compressor capacity coefficient is represented as the abscissa 33.

A compressor operating point, shown for example at 36, is calculated from sensor data every leaving water temperature (LWT) sample period. The compressor operating point 36 is a representation of the actual point of operation of the compressor 12 at the particular time that the sensor data is taken. The compressor operating point 36 is compared to the value of surge boundary control curve 38. The surge boundary control curve 38 is a calculated operating limit that is positioned proximate to a region 32 of actual surge as detected by intermittant surge events. A pressure error deadband 34 is selected about the surge boundary control curve 38 such that an upper limit 35 of the pressure error deadband 34 approaches an actual surge occurence as defined by the region of actual surge 32. It is the function of the control system to ensure that the compressor operating point 36 is optimally located in the region defined by the selected pressure error dead band 34, located about the surge boundary control curve 38. Preferably the compressor operating point 36 is located between the surge boundary control curve 38 and a lower limit 37 of the pressure error deadband 34. As depicted in FIG. 2, the pressure error dead band 34, and in particular its upper limit 35, is located proximate the region 32 of actual surge for the most efficient operation without entering into the surge region. The compressor operating point 36 is calculated from sensor data every LWT sample period. Information from this mapping is used in the adjustment of the inlet guide vane and impeller control setting, as well as the surge curve adjustment control as will subsequently be described.

During operation of air conditioning system 10, two very distinct control operating modes exist pursuant to the invention. In one operating mode, compressor capacity modulation is based on modulating inlet guide vane position. This mode is referred to in FIG. 3 as GVMODE = 1. In GVMODE = 1, capacity control is achieved by varying inlet guide vane position and, under certain circumstances, by varying impeller speed. In the second operating mode, compressor capacity modulation is achieved by modulating impeller speed only. This mode is referred to as GVMODE = 0. Operation in the GVMODE = 0 mode occurs once the inlet guide vanes 29 have reached a predetermined open position and the LWT is determined to be in a steady state operating condition.

At air conditioning system start up, the operating mode is GVMODE = 1 and the compressor impeller 27 rotates at full speed (i.e. the speed that is possible at normal power line frequency of 60 HZ). A conventional Leaving Water Temperature (LWT) control mode modulates inlet guide vane position and hence unit capacity to bring the Leaving Water Temperature within a deadband about a set-point. The set-point is an input by the air conditioning system user and may be varied as desired. It takes a certain period of time after start up for the leaving water to attain the desired set-point temperature. During this period of time following start up, the LWT is sampled frequently in order to bring the centrifugal chiller to a point where the LWT is at a steady state within the dead band about the set point. In the preferred embodiment, this sampling occurs every five seconds until the steady state condition is achieved.

To determine if the Leaving Water Temperature is in steady-state, a standard deviation in Leaving Water Temperature about the chilled water set point is computed over a moving, fixed point, time window. Once the standard-deviation in LWT about the chilled water set point is lower than a user specified deviation for a specified time period, the Leaving Water Temperature is assumed to be in steady-state and operating within a deadband about the setpoint.

As long as the LWT steady-state evaluation is true, e.g. sensed to be within the selected dead band, a slower control loop, with a sample period of 5 minutes is executed. An attempt to reduce impeller speed by reducing the frequency of the power to the compressor motor 13 is made each time the slower control loop is executed. This control loop acts on the compressor pressure coefficient error, PCerr. The PCerr is equal to the compressor operating point, exemplary shown at 36, minus the surge control boundary curve, depicted at 38. A compressor speed change is computed proportional to the PCerr. During operation, if the compressor operating point 36 of the compressor lies below the surge boundary control curve 38, a compressor speed decrease may be commanded in order to bring the compressor operating point 36 into the pressure error dead band 34. Every time the slow control loop requests an impeller speed decrease, the inlet guide vanes 29 open further by closed loop control action to compensate for the decrease in unit capacity that occurs by reducing impeller speed. By decreasing impeller speed, unit efficiency is increased and the compressor operating point 36 moves closer to the pressure error dead band 34.

After a number of impeller speed decreases have occurred and if sufficient cooling load exists, the inlet guide vanes 29 will be driven to the predetermined maximum open condition to compensate for the successive impeller speed reductions. When the inlet guide vanes 29 reach the maximum open condition and the Leaving Water Temperature is in steady-state, a test is conducted to see if the vanes are commanded to stay at maximum for three consecutive sample periods (a total of 15 sec). If this test is found to be true, control will transition into the second operating mode identified as GVMODE=0. Alternatively, fuzzy logic or the like could be used to determine when the transitions between the first and second operating modes occur.

In the GVMODE=0 operating mode, compressor capacity is modulated by modulating only impeller speed which in turn is achieved by controlling the frequency of the power to the compressor motor 13. Like the GVMODE=1 operating mode, capacity modulation is based on the deviation in LWT from a user specified set point. This control mode uses the same LWT control output as in GVMODE=1 with an appropriate scaling factor. The scale factor makes the resulting capacity change due to an incremental change in impeller speed match the resulting capacity change that would occur from a certain discrete change in inlet guide vane position.

One key requirement to providing acceptable control performance in this mode is the ability to match load capacity requirements. This means the inverter that provides the power to the impeller motor 13 must provide appropriate speed resolution to permit continuously variable capacity generation capable of matching load capacity by impeller speed modulation. The fall back position in the event that impeller speed modulation does not adequately match the load capacity of the air conditioning system 10 is to return to capacity control by means of the control mode GVMODE=1. Accordingly, three conditions will cause immediate transition from the GVMODE=0 operating mode back to the GVMODE=1 operating mode. These conditions are:

a) Detecting a positive pressure coefficient error 39. This means that the compressor operating point 36 is operating above the surge boundary control curve 38 as depicted in FIG. 2, thereby placing the current compressor operating point 36, too close to the actual surge region such that there is the possibility of the compressor 12 experiencing a surge condition. Reference numeral 39 illustrates the positive pressure coefficient error 39 when the compressor operating point exceeds the surge boundary control curve 38.

b) Detecting a forced unload limit. There are a number of air conditioning system limits that are continually monitored. Such limits are for example, condenser 14 pressure too high, motor 13 current too high, and evaporator 18 refrigerant temperature too low. If any of these or other protective limits are exceeded, a decrease in centrifugal compressor 12 output is required to alleviate the limit condition.

c) Detecting a surge. This means that an actual surge event has occurred which, in the present invention, is detected by monitoring motor current.

For any of the transition conditions stated above, impeller speed will also be affected as described below. Any time a positive pressure coefficient error 39 is detected, impeller speed is increased in a set proportion to the positive pressure coefficient error 39. Anytime a limit requiring forced unloading is detected, the limit is exercised by increasing the angle of the variable inlet guide vanes with respect to the direction of refrigerant flow. Since this acts to reduce the compressor 12 capacity, the impeller speed is also increased in proportion to the forced unload command to compensate for the vane angle change so that the capacity of the compressor is not dramatically changed. Finally, the detection of a surge occurence based upon monitored motor current increases the impeller speed by 2 Hz to terminate the present surge condition. The detection of a surge occurence may modify either or both of the slope or the formula of the surge boundary control curve 38. The inlet guide vanes 29 will be adjusted to a new position determined by the LWT error.

The region 32 of actual surge may vary from chiller to chiller even though the chillers are nominally identical. Additionally, the region 32 of actual surge for a given compressor 12 is affected by the specific operating environment that the air conditioning system 10 is installed in. Under these conditions, it is desirable that the control method be designed to continually adjust the surge boundary control curve 38 to provide the highest possible efficiency for a given chiller and its present operating condition. In the present invention this is accomplished by initially setting the surge boundary control curve 38, conservatively (i.e. considerably lower than the region 32 of actual surge) on the nondimensional compressor map.

After air conditioning system 10 start up and stabilization, the control system will try to decrease impeller speed to increase efficiency and move the compressor operating point 36 closer to the surge boundary control curve 38 as previously discussed. Once the compressor operating point 36 falls within the pressure error deadband 34, no further impeller speed reductions are allowed. However, if the unit reaches this point and no surge condition exists and the unit's LWT is in steady-state, the y-intercept 22 of the surge boundary control curve 38 is raised by a discrete amount. This action allows a pressure error to once again exist by raising the surge boundary control curve 38 above compressor operating point 36 and hence allows further speed reductions to occur to continue to optimize unit efficiency. This process will continue until the surge boundary control curve 38 is raised up to the point at which the compressor operating point 36 enters into a region 32 of actual surge.

Surge detection logic preferably monitors the peak rectified and filtered values of one of the impeller motor 13 phase currents (formed by a hardware circuit) to determine a change that correlates to an audible surge occurrence. Motor phase current changes dramatically in response to a surge condition. In the preferred embodiment, five surge occurrences in one minute denote a surge event, but a person of skill in the art will recognize that surge events can be defined in many other ways as is well known in the art. If a surge event is established, the speed of motor 13 is increased by 2 Hz to terminate the present surge. Such detection of phase current or phase change is well known in the art as shown, for example, by U.S. Pat. Nos. 5,058,031 and 5,056,032 to Swanson et al. Each of these patents is assigned to the assignee of the present invention and each is hereby incorporated by reference.

In addition to the above speed increase, the y-intercept 22 of the surge boundary control curve 38 is decreased by a discrete amount to prevent a surge at similar conditions in the future. Any time the surge boundary control curve 38 is lowered, a flag is set which will not allow the surge boundary control curve 38 to be raised again until the compressor pressure coefficient error PCerr of the air conditioning system 10 exceeds a user specified magnitude (efficiency aggressiveness factor) greater than the boundary pressure error deadband 34 magnitude. This allows continued operation at the air conditioning system 10 self optimized operating condition while allowing further efficiency improvements to occur if a change in load or operating conditions cause the compressor pressure coefficient error PCerr of the air conditioning system 10 to become larger than the user specified efficiency aggressiveness factor.

Figure 3A:
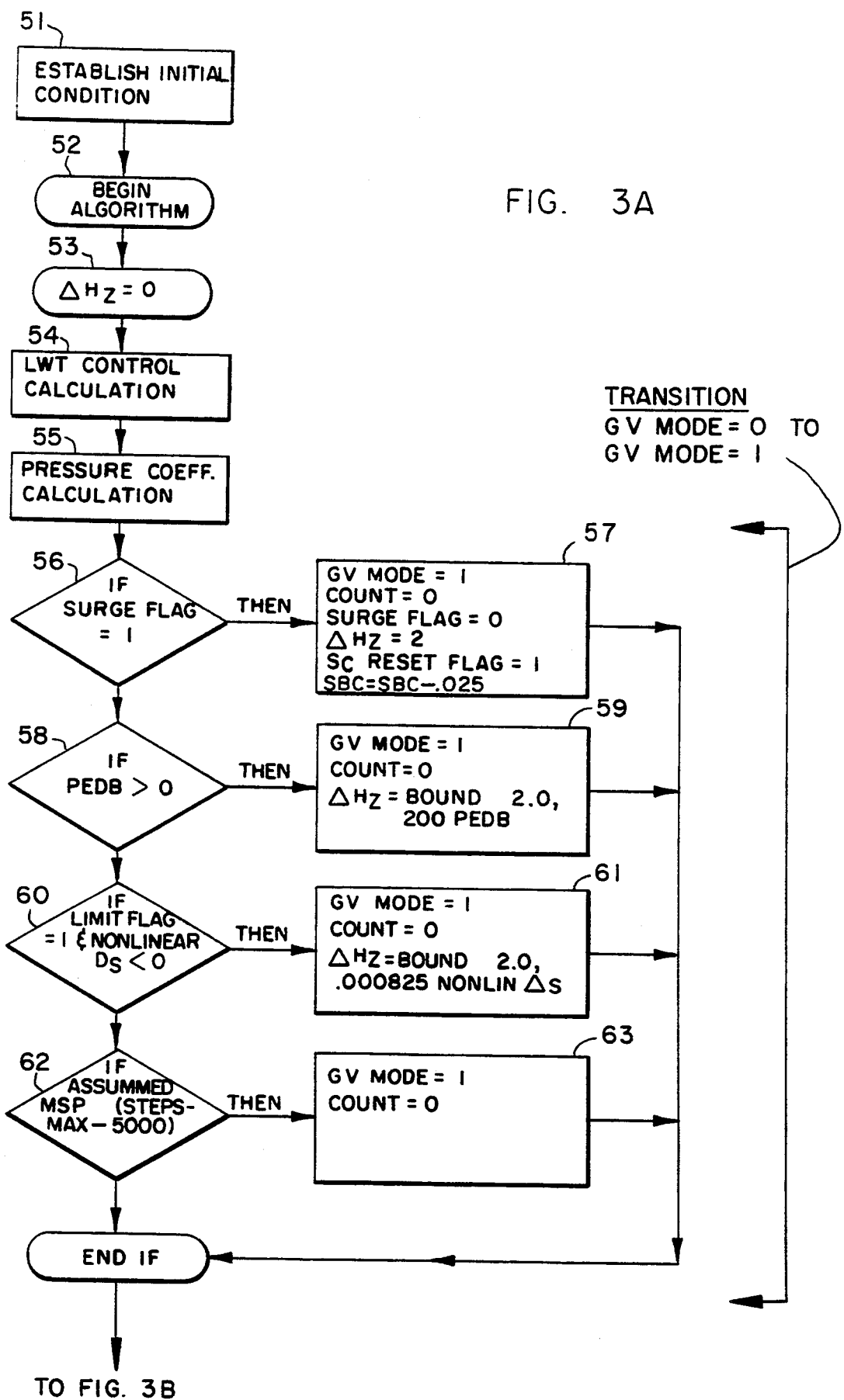
Figure 3C:
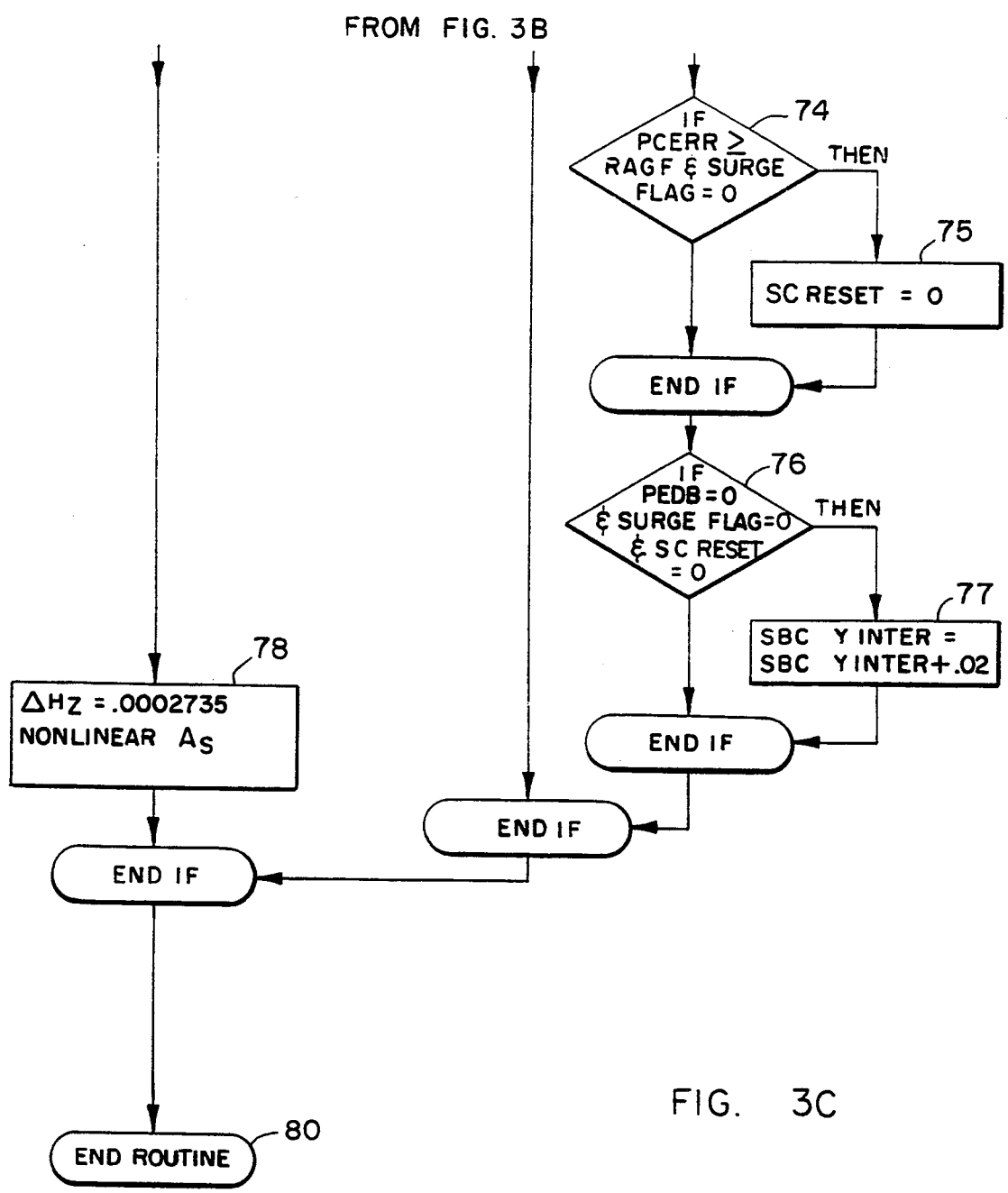

The control method decision flow for the GVMODE=1 is as indicated in FIGS. 3A, 3B and 3C. Step 51 of the algorithm establishes the initial conditions. In the initial conditions, the guide vane mode equals one (GVMODE=1). The inlet guide vanes 29 are preferably positioned by a stepper motor. In the preferred embodiment, there are approximately 50,000 steps between fully closed and the fully open positions of the inlet guide vanes. The predetermined maximum open position is referred to in the flow chart as stepsmax. Typically, in the maximum position the inlet guide vanes 29 will be aligned with or nearly aligned with the refrigerant flow stream into the impeller. The motor 13 in the initial condition is running at full speed. This corresponds to a frequency input to the motor 13 of the full line frequency of 60 Hz. Capacity control is achieved using only inlet guide vane position modulation.

Step 52 is an initialization command that commences the program. Step 53 indicates that Delta Hertz (Hz) equals zero. Delta Hz is a command for a change in the frequency of the power that is applied to the motor 13 driving the impeller. This is preferably accomplished through the use of an inverter. A change in the frequency of the power to the motor 13 will effect a proportional change in the rotational speed of the impeller. Accordingly, when Delta Hz equals zero, there is no change to the impeller speed being commanded.

Step 54 is the Leaving Water Temperature control calculation. Leaving Water Temperature, as previously indicated, is the temperature of the chilled water as it leaves the evaporator 18. Neglecting line losses, it is water of this temperature that actually cools the space being conditioned by the air conditioner. The Leaving Water Temperature (LWT) is an appropriate parameter to utilize to control the capacity of the air conditioning system 10. The setpoint is effectively the thermostatic control of the air conditioned space that is set by the user. In order to control the LWT of the air conditioning system 10, a deadband of small deviation from the setpoint is established about the setpoint. If the LWT is within the deadband, the LWT is assumed to be in control.

Step 55 is calculation of the pressure coefficient. Referring to FIG. 2, the compressor operating point is shown at 36 and is an indication of the current operating condition of the air conditioning system 10. The calculation is per the previously described equation (2).

Steps 56 through 63 indicate the conditions under which the system will transition from GVMODE=0 to GVMODE=1. As previously indicated, in GVMODE=0 the capacity of the centrifugal chiller is controlled fully by varying the speed of the impeller 27. In GVMODE=1 the centrifugal chiller's capacity is controlled by varying the angle of the inlet guide vanes 29 between a predetermined maximum open position and a fully closed position and by varying impeller speed, if the stated conditions in steps 56, 58, 60, and 62 are sampled and found to be true.

Step 56 looks to see if a surge flag equals one, indicating that the system has detected a surge condition or event. In a surge condition, the impeller 27 is rapidly unloaded and then loaded again as a pressure differential develops. This results in widely varying motor current. Accordingly, a typical way of detecting a surge is by monitoring the current flow to the motor 13 and sensing major fluctuations in the rectified and filtered phase current. Other means of sensing a surge condition are also contemplated.

Step 57 indicates what occurs in the event that the surge flag equals one. The Delta HZ is set to equal positive two. This means that the frequency of the power being provided to the motor 13 that drives the impeller is increased by two hertz. This increase will increase the speed of the impeller 27, thereby driving the system away from a surge condition. Also, the GVMODE is immediately shifted to one, and the compressor 12 capacity is controlled by the inlet guide vanes 29. The surge flag is reset to zero after a specified period of time, ensuring that another surge event will be detected but allowing time for the unit to respond to the action taken in attempts to end the present surge. The Y-intercept 22 of the surge boundary control (SBC) curve 38 is decreased by a factor of 0.025. The effect of this decrease is to move the surge boundary control curve 38 downward away from the region of actual surge 32. The upper limits for the operating conditions of the compressor 12 are set by the location of surge boundary control curve 38 and the pressure error deadband 34 about the surge boundary control curve 38. Accordingly, decreasing the surge boundary control Y-intercept 22 effectively moves the operating region for the compressor 12 further from the region of actual surge 32. This helps to ensure that the compressor 12 will not reenter the condition of actual surge 32. Also, a surge boundary control reset flag (SC reset) is set equal to one to indicate that the surge boundary control curve 38 cannot be adjusted upward until the conditions described subsequently in connection with steps 74 through 77 of FIG. 3 are met. Additionally, a count of the number of time that stepsmax is exceeded is set to zero.

Step 58 looks to see if the compressor operating point 36 is located within the pressure error deadband (PEDB) 34 as depicted in FIG. 2. This is accomplished by calculating PCERR. A determination that the PCERR is greater than zero indicates the compressor operating point 36 is operating above the pressure error deadband 34. Operation in this region is deemed to be too close to the region 32 of actual surge. Accordingly, in step 59 the GVMODE is set at one and the Delta HZ is increased in proportion to the error but bounded at plus or minus 2 Hertz. The increase or decrease in speed is determined by the location of the compressor operating point 36 with respect to the pressure error deadband 34. If the compressor operating point 36 is located above the pressure error deadband 34, a maximum positive two hertz input will be provided to the motor 13 to increase impeller speed. If the compressor operating point 36 is located below the pressure error deadband 34, a maximum negative two cycle decrease in frequency will be provided to the motor 13, thereby reducing the impeller speed.

The actual speed change is calculated to be in proportion to the error, but bounded by the previously indicated 2 HZ limits. Since the pressure error deadband 34 is a relatively small number in the preferred embodiment, the scaling factor of 200 is utilized to obtain a meaningful result with respect to a change in impeller speed. In all cases, Delta HZ is limited to two hertz. This is to ensure gradual changes of the impeller speed. If a greater change in impeller speed is required, a Delta Hz command will again be generated on the next passage through the sequence.

Step 60 looks to see if a limit flag equals one and if the non-linear Ds is less than zero, implying a forced unload requirement. When the limit flag equals one, this in an indication that one of a number of set operating limits within the air conditioning system 10 has been exceeded. As previously indicated, such limits include, by way of example, condenser 12 pressure too high, motor 13 current too high, and evaporator 18 refrigerant temperature too low. The system at this time also looks to see if the non-linear Ds is less than zero. The factor Ds is the commanded step change to the inlet guide vane stepper motor actuator. It is the stepper motor that positions the inlet guide vanes 29. A command that is less than zero is a negative command and will close the inlet guide vanes 29 a set amount. When these two conditions are met, then in step 11, the GVMODE equals one, the count equals zero, and the Delta HZ has a boundary of plus or minus two hertz.

The default means of remaining in GVMODE equals one is indicated in step 62. Step 62 looks to see if the assumed motor step position is less than the quantity stepsmax minus 5000 steps. The assumed motor step position is an indication of the current position of the inlet guide vanes 29. Stepsmax represents the predetermined maximum position of the inlet guide vanes 29.

Step 64 looks to see if the GVMODE equals one. The GVMODE will equal one if any of the tests of steps 56, 58, 60 and 62 have been satisfied. If the GVMODE is one, then the system progresses to 66 where a linearized step output is generated by conventional interpolation. This command is sent to the stepper motor that drives the inlet guide vanes 29 and will move the guide vanes 29 to a new selected position to control LWT.

In step 67, the system looks to see if the assumed motor step position is equal to or greater than stepsmax minus 5000 and whether SSeval equals one. If the assumed motor step position is equal to or greater than stepsmax minus 5000, that is an indication that the inlet guide vanes are close to their fully open position. SSeval is an evaluation that is performed to determine if the LWT of the air conditioning system 10 is operating in a steady state condition.

To determine if the Leaving Water Temperature is in steady state, a standard deviation in Leaving Water Temperature about the chilled water setpoint is computed over a moving, fixed point, time window. Once the standard deviation in LWT about the chilled water setpoint is less than a user specified deviation, the Leaving Water Temperature is assumed to be in steady state. The process looks at the LWT each ten seconds for the last ten minutes to make the determination of steady state conditions.

When the inlet guide vanes 29 have reached their predetermined fully opened position, the GVMODE should preferably be zero and compressor 12 capacity control should preferably be limited to the control exerted by increasing or decreasing the speed of the impeller 27. Accordingly, steps 68, 69 and 70 shift the system to the operating mode GVMODE=0 and reset the count to zero so that the conditions can be re-evaluated on the next routine cycle. It should be noted that the routine consisting of steps 68, 69 and 70 is the only means by which the air conditioning system 10 operating in mode GVMODE=1 is shifted to the GVMODE=0. Upon initialization of air conditioning system 10 operation, the process flow will advance down the steps depicted on the left side of FIG. 3a to step 54 to determine if the conditions are met to transfer from the condition of GVMODE=1, that is commanded at initialization, to GVMODE=0. The shift will be made only if steps 68, 69 and 70 are successfully negotiated.

Step 67 essentially looks at whether the inlet guide vanes 29 are close to the predetermined fully opened position. If the inlet guide vanes 29 are not in the fully opened position, there is a need to drive them to that position so that the GVMODE can be set to zero and compressor 12 capacity controlled by modulating the speed of the impeller 27. It is in the GVMODE=0 mode of operation that the air conditioning system 10 can be at its most efficient operation. Accordingly, step 71 looks at three different conditions. The first condition is whether the compressor operating point 36 is equal to or less than the pressure error deadband 34. The second condition that is looked at is whether SSeval is true. Effectively, this determines whether the air conditioning system 10 is in a steady state. If it is in a steady state, then the SSeval equals one. The third condition verifies that five minutes have elapsed since the last time steps 72 through 77 were executed.

If the three conditions are met, the system will look at the pressure error deadband 34 as indicated in step 72. This logic step contains the conditions required to elevate the surge boundary control curve 38. Elevating the surge boundary control curve 38 permits more efficient operation, by allowing the compressor 12 to operate closer to the region 32 of actual surge. The system compares the compressor operating point 36 and the pressure error deadband 34 to see where the compressor operating point (COP) lies with respect to the pressure error deadband 34. Effectively, the control system subtracts the pressure error deadband 34 from the compressor operating point (COP) 36. If the result of the subtraction is a negative number, or in other words if the pressure error deadband 34 is less than zero, then the compressor operating point 36 is operating below the pressure error deadband 34. To increase the efficiency of the centrifugal chiller the speed of the impeller 27 should be decreased forcing the compressor operating point 36 closer to pressure error deadband 34. Accordingly, a Delta HZ command is generated as indicated in step 73. The Delta HZ command is bounded by a two cycles and will be a value that is equal to forty times the value of the pressure error deadband 34, if that value does not exceed two HZ.

Step 72 looks at the control deadband and the actual compressor operating point 36 in FIG. 2. If compressor operating point 36 is less than the pressure error deadband lower limit, the difference will be less than zero, i.e. negative. This indicates that compressor 12 is operating too far beneath the pressure error deadband 34 for the most efficient operation. Accordingly, a Delta HZ signal, bounded by minus two hertz, is provided as the output for step 73. Decreasing the input power frequency to the impeller motor 13 slows the impeller 27 down, elevating the compressor operating point 36 point of the compressor 12 to a point closer to the pressure error deadband 34.

The next step of the program is indicated in step 74. Step 74 looks to see if PCerror is greater than or equal to the reset aggressiveness factor (RAG$_f$). PCerror again is an indication of how close the actual compressor operating point 36 is to the surge boundary control curve 38. The reset aggressiveness factor is an arbitrary number which is greater than the pressure error deadband 34 and is established by the operator to define the conditions under which the surge boundary control curve 38 may be raised once that curve 38 has been lowered. Effectively, if the reset aggressiveness factor is set at a low number, a small PCerror will be adequate to initiate steps 75 through 77. A less aggressive, larger number will require a larger PCerror to initiate steps 75 through 77.

Step 74 is a two part test that looks to see if the PCerror is equal to or less than the reset aggressiveness factor and also looks at whether or not a surge has been detected as indicated by a surge flag. If the PCerror exceeds than the reset aggressiveness factor and no surge has been detected, the system will not attempt to reduce the impeller rotational speed.

In step 75 this logic segment resets the surge boundary control reset flag (SC reset) to zero. When the surge boundary control reset flag is zero, the surge boundary control curve 38 can be raised on the plot depicted in FIG. 2 if conditions allow. This sets the stage for more optimization of the efficiency of the air conditioning system 10 when so warranted.

The next logic segment 76, 77 contains the conditions required to raise the surge boundary control curve 38 upward. As previously indicated, raising the surge boundary control curve 38 higher permits more efficient operation, by placing the compressor 12 operation closer to the undesirable operating condition of surge as depicted at 32 in FIG. 2. Step 76 is a three part test. Step 76 tests to see if the PCerr equals zero, indicating that the compressor operating point 36 is operating within the pressure error deadband 34. Step 76 also looks to see if the surge flag is zero, indicating that no surge has been detected and looks to see if the surge boundary control reset flag is set at zero. As previously indicated in step 75, the surge boundary control reset flag will be zero if the conditions of step 74 have been met.

When the conditions of step 76 have been met, then the surge boundary control curve 38 is raised by an increment of plus 0.02 on the dimensionless abscissa of FIG. 1. As previously indicated, such action permits the compressor 12 operating point, as indicated at the compressor operating point 36 to be elevated to a more efficient point of operation on subsequent performances of the control sequence.

Step 78 includes a scaling factor that relates the air conditioning system 10 output capacity change caused by a LWT control error. Step 78 follows from step 64, in which it was determined that the GVMODE equals zero. Accordingly, the system at this point is operating with centrifugal chiller capacity being controlled only by changes in impeller speed. It is desirable that there be a known relationship between the capacity change caused by a hertz change in the impeller motor frequency and the capacity change affected by a single step input to the stepper motor that drives the inlet guide vanes.

The flow chart is exited in step 80.

Although the present invention is described with respect to the preferred embodiment, modification thereof will become apparent to those skilled in the art. For example, although the present invention describes the detection of surges based upon monitored motor current, other ways of detecting surge are known (including pressure or noise monitoring) and all such ways are contemplated. Therefore, the scope of the invention is to be determined by reference to the claims which follow.

We claim:

1. A controller for adjusting the capacity of a variable capacity centrifugal compressor driven by a motor, the controller adapted for adjusting the capacity of the compressor in response to demand while minimizing electric power consumption and avoiding surge conditions, comprising:

means for establishing a dimensionless plot of possible points of compressor operation relating the pressure coefficient and the capacity coefficient of the centrifugal compressor;

means for determining the current operating point of the centrifugal compressor on the plot;

means for determining a region of actual surge on the plot;

means for plotting a dynamic surge boundary control curve proximate the region of actual surge; and means responsive to variations of the region of actual surge and the surge boundary control curve for controlling compressor capacity by varying the opening of the inlet guide vanes and varying the speed of the compressor to move the operating point of the compressor proximate the surge boundary control curve.

2. The controller for adjusting the capacity of the compressor of claim 1, wherein the surge boundary control curve is continually updated with the plot of each new surge event.

3. The controller for adjusting the capacity of the compressor of claim 1, wherein the surge boundary control curve is continually repositioned with respect to the region of actual surge to provide efficient compressor operation and avoid surge conditions.

4. The controller for adjusting the capacity of the compressor of claim 3, wherein the surge boundary control curve includes means for continually repositioning the surge boundary control curve as a function of:
   a. determining when the compressor operating point is within a set deadband about the surge boundary control curve;
   b. sensing that no surge event has occurred since the last calculating time period;
   c. determining that the surge boundary control curve has not been updated since the last calculating time period.

5. The controller for adjusting the capacity of the compressor of claim 1, having a first control mode wherein the capacity of the compressor is controlled by varying the inlet guide vane position and by varying the compressor speed and having a second control mode wherein the inlet guide vanes are set to a predetermined full open condition and compressor capacity is controlled only by varying the speed of the compressor.

6. The controller for adjusting the capacity of the compressor of claim 5, wherein the first mode of controlling compressor capacity includes first means for approaching the most efficient operating point of the compressor by determining that the chilled water temperature is in control, iteratively reducing the speed of the compressor, and correspondingly opening the inlet guide vanes to compensate for the reduced compressor speed to maintain control of the chilled water temperature.

7. The controller for adjusting the capacity of the compressor of claim 5, wherein the second mode of controlling compressor capacity second means for approaching the most efficient operating point of the compressor by determining that the chilled water temperature is in control and iteratively reducing the speed of the compressor, while maintaining control of the chilled water temperature.

8. The controller for adjusting the capacity of the compressor of claim 5, wherein the mode of controlling the operation of the compressor includes first means for shifting from the second mode to the first mode as a function of determining at least one of the following:
   a. sensing that a surge event has occurred;
   b. determining that the compressor operating point is located above the surge boundary control;
   c. sensing that an operating limit of the air conditioning system has been exceeded;
   d. sensing that the inlet guide vanes are not in the full open position.

9. The controller for adjusting the capacity of the compressor of claim 5, wherein the mode of controlling the operation of the compressor includes second means for shifting from the first mode to the second mode as a function of determining the following:
   a. the chilled water temperature is in control;
   b. the inlet guide vanes are at a predetermined maximum position.

10. A control method for a centrifugal chiller having a centrifugal compressor integrated into a refrigeration loop, the refrigeration loop additionally comprising a condenser and an evaporator, the compressor being adapted for the most efficient operation proximate an undesirable surge operating condition, the centrifugal compressor having an impeller and variable inlet guide vanes, the method comprising:
   generating a dimensionless plot of possible operating points of the centrifugal compressor;
   periodically sampling actual surge events experienced by the compressor during operation, to determine a region of actual surge;
   periodically positioning an operating limit curve proximate the region of actual surge on the plot to define a compressor operating area that provides for efficient operation and yet avoids the occurrence of surge events;
   defining the actual operating point of the compressor on the plot; and
   controlling the operating point of the compressor by selectively adjusting the impeller speed and variable inlet guide vanes to position the operating point of the compressor at the operating limit curve.

11. The control method of claim 10 wherein the dimensionless plot is a two dimensional plot having two axes;
   the first axis representing values of the capacity coefficient of the centrifugal chiller, the capacity coefficient being a function of the refrigerant tonnage produced by the chiller, the rotational speed of the impeller and the diameter of the impeller; and
   the second axis representing the pressure coefficient of the chiller, the pressure coefficient being a function of the rotational speed of the impeller, the diameter of the impeller, the number of impellers, where more than one impeller is employed, and the isentropic enthalpy rise across the condenser.

12. The control method of claim 10 wherein the control method includes a bias that seeks an operating point of the chiller in which the inlet guide vanes are in a predetermined fully open position and chiller capacity is being controlled solely by the rotational speed of the impeller, the rotational speed of the impeller being set at a speed that places the operating point of the chiller proximate the operating limit curve.

13. The control method of claim 10 wherein the control method is responsive to the occurrence of a surge event and reacts to redefine the region of actual surge, reposition the operating limit curve to avoid the region of actual surge and controls the chiller to reposition the operating point of the compressor to avoid the reoccurrence of a surge condition.

14. The control method of claim 13 wherein, at the occurrence of a surge event, the control method transitions from a mode of control of the compressor that solely utilizes impeller speed control to a mode of operation in which control of the compressor utilizing inlet guide vane positioning and impeller speed is enabled.

15. A control method for use with a control system in controlling a centrifugal compressor, the compressor having variable inlet guide vanes and at least one rotationally driven impeller and being adapted such that the most efficient operation of the compressor occurs when the variable inlet guide vanes are in a predetermined fully open position and compressor capacity is controlled solely by the speed of the impeller, the control system sensing a steady state operating condition of the compressor, defined limits compelling that the compressor be unloaded, the inlet guide vane position, the impeller speed, sensing the current operating condition of the compressor the control method comprising:

a first control mode in which the control of the compressor capacity is a function of inlet guide vane positioning and impeller speed variations;

a second control mode in which the control of the compressor capacity is a function of impeller speed variations with the inlet guide vanes fixed in the fully open position;

defining an operating condition control limit region that is proximate a operating condition where a surge condition is known to occur;

transitioning from the first control mode to the second control mode predicated upon sensing that the compressor is operating in a steady state condition and the inlet guide vanes are in the predetermined fully open position; and transitioning from the second control mode to the first control mode upon the occurrence of at least one of the following:
 a. detecting that the compressor is operating outside the operating condition control limit region;
 b. detecting that the defined limits compelling that the compressor be unloaded have been exceeded;
 c. detecting the occurrence of a surge condition.

16. A controller for adjusting the capacity of a variable capacity centrifugal compressor driven by a motor to maintain a setpoint, the controller adapted for adjusting said capacity in response to demand while minimizing electric power consumption and avoiding a surge conditions, comprising:

means for determining the operating capacity of the compressor and expressing said capacity as a first variable;

means for determining the energy input of the compressor to the refrigerant and expressing said energy input as a second variable;

means for relating the first variable that is indicative of the operating capacity of the compressor to the second variable that is indicative of the energy input of the compressor to the refrigerant;

means for sensing the current operating condition of the compressor;

means for sensing surge conditions and thereby determining a region of actual surge;

plot generation means, responsive to the operating capacity variable sensing means, the energy input constant sensing means and the surge sensing means for plotting a surge curve and an operating limits curve, the operating limits curve being proximate the region of actual surge and defining a region of operation of the compressor such that compressor operation therein avoids surge conditions yet maintains a setpoint in an energy efficient manner; and control means, responsive to the current operating condition sensing means, for relating the operating condition to the first variable that is indicative of the operating capacity of the compressor and the second variable that is indicative of the energy input of the compressor to the refrigerant said control means being adapted for controlling the compressor such that the operating condition of the compressor is within the operating limits curve proximate the region of actual surge.

17. An anti-surge method for a centrifugal compressor comprising the steps of:

determining a machine coefficient;

determining a pressure coefficient;

plotting a compressor operating point as a function of the machine coefficient and pressure coefficient;

monitoring actual surge events;

determining a surge boundary control curve as a function of the monitored actual surge events;

operating the compressor so that the compressor operating point approaches the surge boundary control curve; and modifying the boundary control curve each time a surge event is detected.

18. The method of claim 17 including determining the machine coefficient as a function of compressor vapor flow, the rotational speed of the impellers, and the diameter of the impellers.

19. The method of claim 18 including determining the pressure coefficient as a function of the isentropic enthalpy rise, the number of compressor stages, the impeller diameter, and the rotational speed of the impellers.

20. The method of claim 19 wherein the machine coefficient is determined by the formula:

$$Cap = \frac{KQ}{N Dia^3}$$

and the pressure coefficient is determined by the formula:

$$PC = \frac{(1.3159e9)(\text{Delta } H \text{ isentropic})}{(Numstages)(Dia^2)(N^2)}$$

21. The method of claim 20 wherein the step of operating the compressor includes the steps of varying the speed of the compressor and varying the position of inlet guide vanes.

22. The method of claim 17 wherein surges are detected by monitoring motor current, noise, or compressor pressure differential.

23. The method of claim 17 including the further step of establishing a deadband having upper and lower limits about the pressure boundary curve.

24. The method of claim 23 further including the further steps of establishing an upper limit of the deadband proximate a region of actual surge as determined by the monitored surge events and operating the compressor to place the compressor operating point between the surge boundary control curve and a lower limit of the deadband.

25. An anti-surge system for a centrifugal compressor comprising:

a compressor;

means for determining a machine coefficient;

means for determining a pressure coefficient;

means for plotting a compressor operating point as a function of the machine coefficient and pressure coefficient;

means for monitoring actual surge events;

means, responsive to the monitoring means, for determining a surge boundary control curve;

means for operating the compressor so that the compressor operating point approaches the surge boundary control curve; and means for modifying the surge boundary control curve each time a surge event is detected.

26. The system of claim 25 wherein the machine coefficient is determined as a function of compressor vapor flow, the rotational speed of the impellers, and the diameter of the impellers.

27. The system of claim 26 wherein the pressure coefficient is determined as a function of the isentropic enthalpy rise, the number of compressor stages, the impeller diameter, and the rotational speed of the impellers.

28. The anti-surge system of claim 27 wherein the machine coefficient is determined by the formula:

$$Cap = \frac{K Q}{N\, Dia^3}$$

and the pressure coefficient is determined by the formula:

$$PC = \frac{(1.3159e9)(\text{Delta } H \text{ isentropic})}{(Numstages)(Dia^2)(N^2)}$$

29. The system of claim 28 wherein operating means includes means for varying the speed of the compressor and the means for varying position of inlet guide vanes.

30. The system of claim 29 wherein the monitoring means including means for detecting surges by monitoring motor current, noise, or compressor pressure differential.

31. The system of claim 28 including a deadband about the surge boundary control curve.

32. The system of claim 25 wherein an upper limit of the deadband is proximate a region of actual surge as determined by monitored surge events and wherein the compressor is operated to place the compressor operating point between the surge boundary control curve and a lower limit of the deadband.

33. The system of claim 25 wherein the machine coefficient determining means and the pressure coefficient determining means are determined based upon measurements made relative to an evaporator and a condenser.

34. A method of operating a centrifugal compressor having variable position inlet guide vanes and having impellers controlled by a variable speed motor, comprising the steps of:

operating the variable speed motor at a constant high speed;

modulating the variable position of the inlet guide vanes until the variable position reaches a predetermined maximum position; and incrementally reducing the speed of the motor as long as the variable position of the inlet guide vanes remains at the predetermined maximum position.

35. The method of claim 34 wherein the variable position of the inlet guide vanes is not measured, but is determined on the basis of position commands issued by a controller.

36. A method of operating a centrifugal compressor having impellers motivated by a variable speed impeller motor and having variable position inlet guide vanes, comprising the steps of:

operating in a first mode of operation where the position of the inlet guide vanes is modulated and the speed of the impeller motor is held constant;

operating in a second mode of operation wherein the position of the inlet guide vanes is maintained in a constant position and the speed of the impeller motor is modulated;

transitioning from the first mode of operation to the second mode of operation when the position of the inlet guide vanes approaches a predetermined maximum; and transitioning from the second mode of operation to the first mode of operation when the impeller speed approaches a predetermined maximum.

* * * * *